Jan. 10, 1939.   W. A. HORLACHER   2,143,317
AIRPLANE
Filed June 10, 1937   2 Sheets-Sheet 1
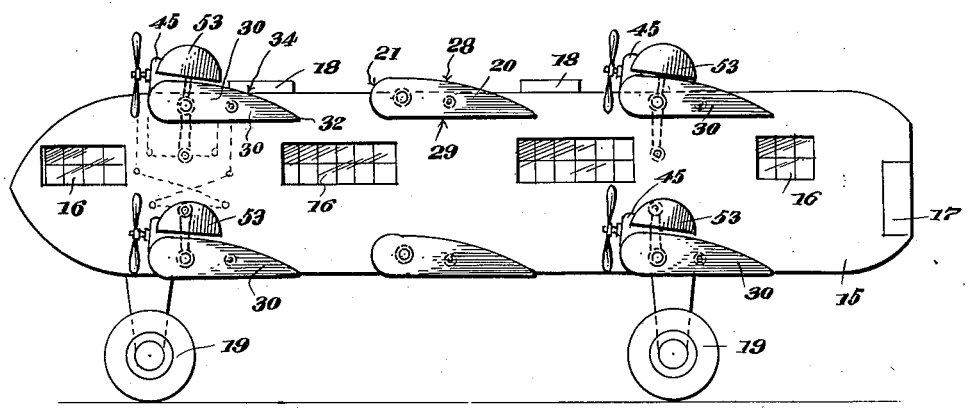
Fig. 1.
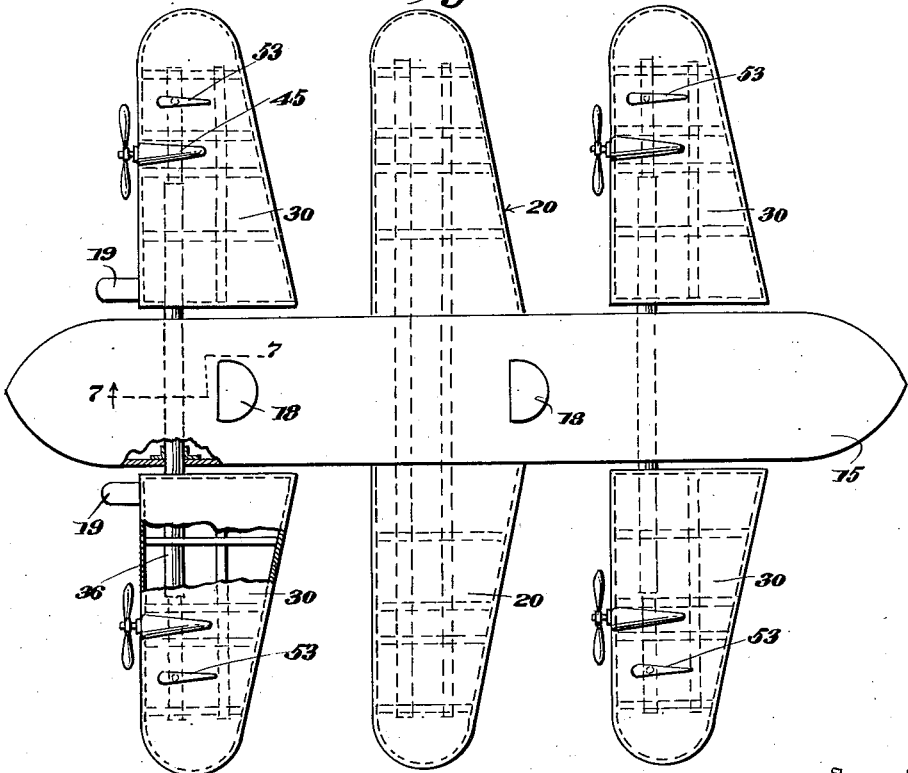
Fig. 2.
Fig. 3.
Inventor
WILLIAM A. HORLACHER
By
Attorney

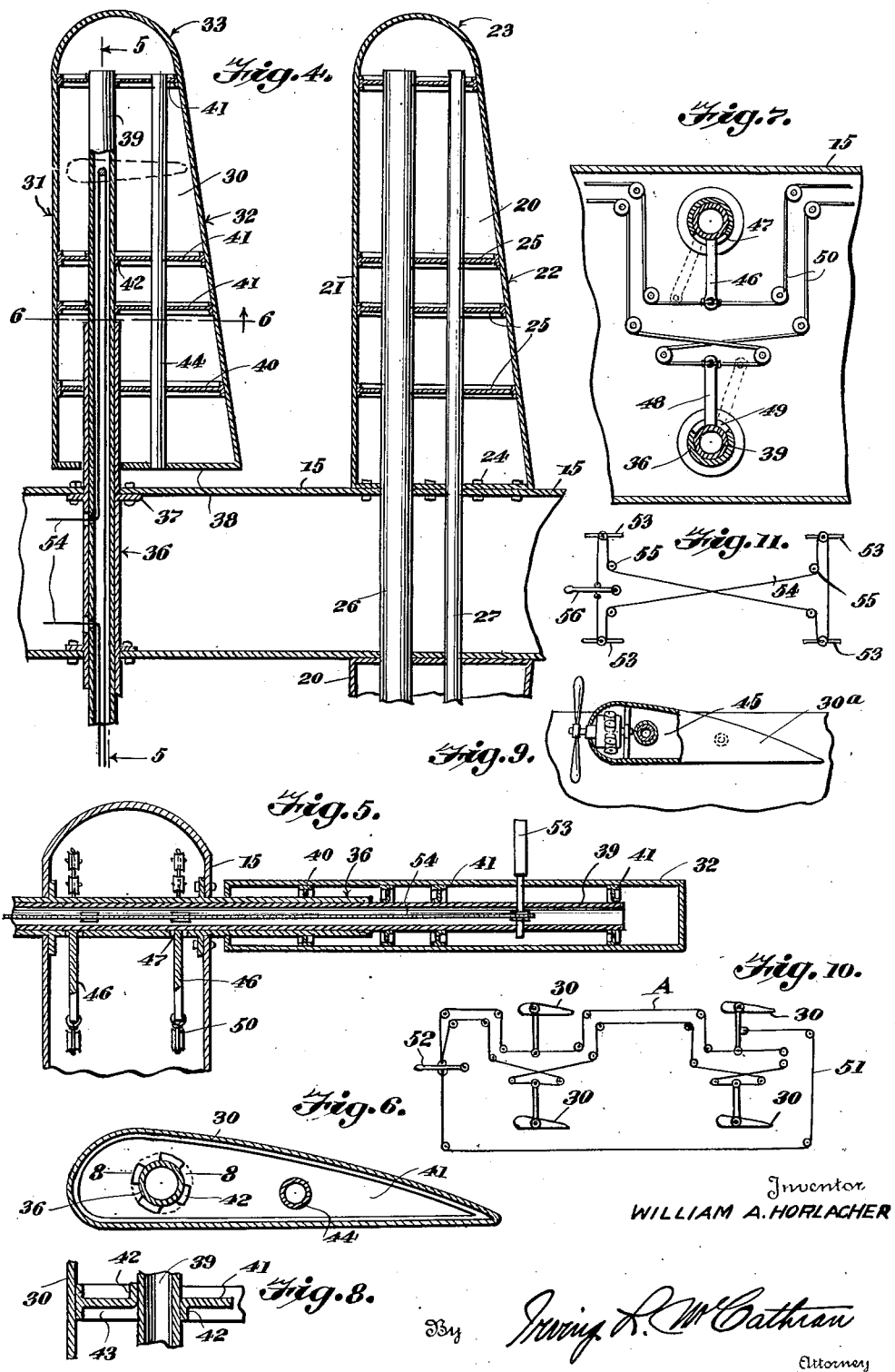

Patented Jan. 10, 1939

2,143,317

UNITED STATES PATENT OFFICE 2,143,317

AIRPLANE

William A. Horlacher, Lethbridge, Alberta, Canada

Application June 10, 1937, Serial No. 147,552

3 Claims. (Cl. 244—48)

This invention relates to an airplane and has for one of its objects the production of an efficient airplane wherein a plurality of wings are horizontally aligned throughout the full length of the fuselage.

A further object of this invention is the production of an airplane wherein a plurality of front and rear wings of the tiltable type are mounted upon the fuselage in a manner whereby the wings themselves may be tilted to elevate the airplane upwardly.

A still further object of this invention is the production of an efficient airplane wherein a plurality of stationary wings are fixed upon the fuselage, preferably intermediate the ends thereof for stabilizing the airplane, other forward and rear tiltable wings being provided to control the elevation of the airplane.

Other objects and advantages of this invention will appear throughout the following specification and claims.

In the drawings:

Figure 1 is a side elevation of the airplane;

Figure 2 is a top plan view thereof;

Figure 3 is a fragmentary side elevation of a portion of the fuselage of the airplane, showing one of the tiltable wings in an adjusted position;

Figure 4 is an enlarged horizontal sectional view through a portion of the fuselage, one of the stationary wings, and one of the tiltable wings;

Figure 5 is a section taken on line 5—5 of Figure 4;

Figure 6 is a transverse sectional view taken on line 6—6 of Figure 4;

Figure 7 is a vertical sectional view taken on line 7—7 of Figure 2;

Figure 8 is a horizontal sectional view taken on line 8—8 of Figure 6;

Figure 9 is a fragmentary side elevation of a portion of the fuselage of an airplane showing a type of wing construction wherein the engine is carried within the wing structure;

Figure 10 is a diagrammatic view illustrating one type of wing control mechanism;

Figure 11 is a diagrammatic view illustrating one type of rudder control mechanism.

By referring to the drawings, it will be seen that 15 designates the fuselage or body of the airplane which preferably consists of an elongated closed structure having windows 16 formed in the sides thereof at suitable locations, a rear exit door 17 and top doors or hatchways 18 which may also be used for the purpose of exits whereby occupants of the airplane may leave the body of the ship without fear of their parachutes becoming entangled during an emergency. The fuselage or body 15 may be supported in any suitable or desired manner upon conventional wheels 19 secured to the bottom of the fuselage 15.

A plurality of laterally extending stabilizing wings 20 are secured to the sides of the fuselage 15, four of these wings being preferably employed as illustrated in the drawings, one pair extending laterally from each side of the fuselage adjacent the top and the other pair extending laterally from the fuselage adjacent to the bottom thereof, the upper and lower pairs being arranged in vertical alignment, or in other words, the upper pair being located directly above the lower pair, note particularly Figure 1. These stabilizer or stationary wings 20 are provided with straight front or leading edges 21 and inclined rear or trailing edges 22 to cause the wings 20 to taper toward their outer ends, the outer ends being rounded, as at 23. The wings 20 are, as stated above, fixed to the fuselage 15 by means of suitable securing elements as indicated at 24. The wings 20 are each provided with transversely extending bracing plates 25 which are arranged in proper spaced relation throughout the length of the wings and transverse securing bracing rods 26 and 27 extend across the fuselage and through the same and these rods 26 and 27 pass through the bracing plates 25, as shown in Figure 4, and are efficiently secured thereto, the rod 27 being slightly smaller in diameter with respect to the rod 26 and being spaced therefrom, these rods 26 and 27 providing efficient supports as well as braces for the stationary wings 20. These wings 20 are arranged preferably at the approximate center of the fuselage 15 intermediate the forward and rear ends thereof. The outer or forward face of each wing 20 is rounded to provide a streamline structure along its leading face 21, and each wing tapers slightly along its top edge as indicated at 28 toward the rear or trailing edge 22 previously described. The bottom face 29 of each wing 20 is preferably straight and extends substantially parallel to the longitudinal axis of the fuselage 15, the stabilizing wings 20 because of the fact that they are stationary remaining at all times in this set position.

In carrying out my invention, I also employ preferably a plurality of tiltable wings 30 arranged fore and aft of the stabilizing wings 20, four forward wings being employed preferably, and four rearward wings, as shown, although it should be understood that any suitable number of tiltable wings may be employed without departing from the spirit of the invention. In the structure illustrated, I employ a pair of forward upper tiltable wings, a lower pair of tiltable wings located directly below the first mentioned wings, a rear pair of upper tiltable wings and a lower pair of rear tiltable wings located directly below the rear upper tiltable wings. In other words, the upper wings are arranged in fore and aft pairs and the lower tiltable wings are arranged in fore and aft pairs, the rear and forward tiltable wings being arranged in vertical alignment. Each pair of tiltable wings is similarly constructed, and it is thought necessary to only describe in detail one pair, the construction of the other pairs being identical.

A tiltable wing 30 is mounted in each side of the fuselage 15 in each pair and each wing 30 is provided with a straight leading edge 31 and an inclined trailing edge 32 being inclined toward the forward edge at its outer end and terminating in a rounded outer portion 33 at the end of the wing. The leading edge 31 is rounded to provide a stream-line structure and the upper face 34 of the wing 30 is inclined toward the rear or trailing edge 32, the bottom face 35 of the wing 30 being straight and lying substantially parallel with the longitudinal axis of the fuselage 15 when the wing 30 is in a horizontal position. The wings 30 of each pair are arranged in transverse relation with respect to the fuselage 15 and are supported upon a transverse hollow tube 36 which extends transversely through the fuselage and is fixed to the sides of the fuselage 15, as indicated at 37, or in any suitable or convenient manner, the tubes 36 extending through the inner ends 38 of the wings 30 for a considerable distance throughout the length of the wings 30. The respective tubes 36 pass through the wings at a point about one-fourth of the width of the wings, as indicated, these wings being in this manner supported near their leading edges. A journal tube 39 is carried by each tube 36 and is journaled therein, and the outer end of each tube 39 supports a wing 30. A bracing plate 40 extends transversely of the wing 30 and engages the tube 36, the tube passing through the plate and permitting the plate to freely rotate. Additional transverse braces 41 are also carried within the wing 30 and are fixed to the journal tube 39 through the medium of laterally extending flanges 42 which are alternately bent in opposite directions to straddle the bearing tube 39 and provide an efficient purchase or securing means upon the bearing tube 39. In this way, the bracing plates 41 will be efficiently secured to the bearing tube 39. This structure is shown clearly in detail in Figures 6 and 8. The bracing plates 40 are also provided preferably with flanged edges 43 for providing wide wing-engaging edges, and as shown in Figure 8 the flanges 42 are alternately bent in opposite directions from the periphery of the apperture in each plate 41 through which the journal tube 39 extends. A second bracing rod or tube 44 is extended longitudinally of each wing 30 near the trailing edge of the wing and in spaced relation with respect to the tubes 36 and 39, as shown clearly in Figures 4 and 6.

One, or more, radial motors 45 may be carried by each wing 30 adjacent the leading edges thereof, and the motor, or motors, may be mounted upon the wings, as shown in Figures 1 and 2.

As shown in Figure 9, the wing 30a may carry the radial motor 45 directly within the wing, if desired, without departing from the spirit of the invention, this being an alternate type which may be used to suit the convenience of the builder.

The journal tube 39 of each upper pair of wings is provided with a pair of depending operating arms 46 which extend through suitable slots 47 formed in the tube 36. The bearing tube 39 of each lower pair of wings is provided with a pair of upwardly extending arms 48 which work through slots 49 formed in the lower tubes 36 to support each pair of wings. These operating arms 46 and 48 are connected to conventional control cables and other means 50 such as are used on present airplanes and the control means may be of any suitable or desired type without departing from the spirit of the invention, a conventional control means being illustrated in Figure 10, and the mechanism being indicated by the letter A and comprising cables 50 passing over suitable pulleys 50 and 51 and connected to a control stick 52 of any conventional type.

Suitable vertically extending rudders 53 are carried by the wings 30 and suitably located thereon, two, four, or any number of these rudders being used, four being used preferably as illustrated. These rudders are operated by means of the conventional operating gear embodying cables 54 passing over suitable pulleys 55, the cable being connected to a suitable control stick 56. The cables 54 which actuate the rudders 53 preferably and pass longitudinally through the tube 39—note Figures 4 and 5.

It should be understood that the control mechanism for actuating the tiltable wings 30, as well as for controlling the rudders 53, may be modified, and these parts may be actuated through the medium of the conventional control means now employed without departing from the spirit of the invention, and it is not desired to limit the present invention to the type described. It is important, however, that the forward rudders turn in an opposite direction to the rear rudders to facilitate steering, but it is also important that the tiltable wings 30, both the upper and lower, as well as the forward and rear tiltable wings, operate in unison and for this reason it is necessary that the cables 50 for the lower wings be arranged in crossed relation, as is illustrated in detail in Figure 7, whereby the upper and lower wings 30 may be pitched at a proper uniform angle. The rear wings are connected to the cables 50, as illustrated in Figure 10, so that all wings may operate in unison.

As will be noted from the drawings, it will be seen that the bearing tubes 39 are journaled within the tubes 36, and since the tubes 36 extend well into the wings 30 and also in view of the fact that the inner ends 38 of the wings 30 are in close proximity to the fuselage or body 15, ice will not readily form upon the movable parts and owing to the slight area or space between the wings 30 and the fuselage 15 any ice which might form may be easily broken loose by a slight movement of the wing 30.

By considering the drawings also, it will be noted that the rounded leading edges of the wings will present a minimum wind-resisting surface and the tiltable wings 30 by being mounted to tilt will enable the airplane or aircraft to be handled with great safety. The tiltable wings 30 may be tilted in a vertical direction for retarding the speed of the airplane and in landing the airplane with greater ease and greater safety and the tilting of these wings 30 may be utilized for increasing altitude of the plane by tilting the forward or leading edges of the wings in a vertical or upward direction causing the aerodynamic wind stream to take the plane to higher altitudes within a shorter distance of flight.

It should be understood that certain detail changes in the mechanical construction may be employed without departing from the spirit of the invention so long as such changes fall within the scope of the appended claims.

Having described the invention, what I claim as new is:

1. In combination with a fuselage, a supporting transversely extending tube carried by the fuselage projecting laterally therefrom, a tiltable wing mounted for tilting movement upon opposite ends of said supporting tube and upon opposite sides of said fuselage, said supporting tube extending longitudinally of each wing for a portion of the length of each wing, a bracing plate carried by each wing and engaging said bracing tube and rotatable upon the bracing tube, said bracing plate being mounted within the wing in spaced relation from the inner end of the wing, a bearing tube extending throughout the length of the first mentioned tube and projecting beyond the ends of the first mentioned tube, transverse braces mounted within each wing and fixed to said bearing tube at a point beyond the ends of the supporting tube and arranged in spaced relation with respect to each other and fixed against relative movement with respect to said transverse braces, and a second bracing rod extending longitudinally of each wing and fixed to said bracing plate and transverse braces for reinforcing the braces and bracing plate.

2. In combination with a fuselage, a supporting transversely extending tube carried by the fuselage projecting laterally therefrom, a tiltable wing mounted for tilting movement upon opposite ends of said supporting tube and upon opposite sides of said fuselage, said supporting tube extending longitudinally of each wing for a portion of the length of each wing, a bracing plate carried by each wing and engaging said bracing tube and rotatable upon the bracing tube, said bracing plate being mounted within the wing in spaced relation from the inner end of the wing, a bearing tube extending throughout the length of the first mentioned tube and projecting beyond the ends of the first mentioned tube, transverse braces mounted within each wing and fixed to said bearing tube at a point beyond the ends of the supporting tube and arranged in spaced relation with respect to each other and fixed against relative movement with respect to said transverse braces, a second bracing rod extending longitudinally of each wing and fixed to said bracing plate and transverse braces for reinforcing the braces and bracing plate, a rudder carried by each wing, each rudder having a rudder operating shaft journaled in said journal tubes, flexible means extending longitudinally of the journal tubes, said transverse supporting tube being slotted, said flexible means extending through the slots in said supporting tube and also passing through said journal tubes to permit the rotation of the journal tube within the supporting tube, operating arms carried by said journal tubes, said supporting tube having slots through which said operating arms extend, and means for shifting said operating arms for changing the tilt of said wings.

3. In combination with a fuselage, a supporting transversely extending tube carried by the fuselage projecting laterally therefrom, a tiltable wing mounted for tilting movement upon opposite ends of said supporting tube and upon opposite sides of said fuselage, said supporting tube extending longitudinally of each wing for a portion of the length of each wing, a bracing plate carried by each wing and engaging said bracing tube and rotatable upon the bracing tube, said bracing plate being mounted within the wing in spaced relation from the inner end of the wing, a bearing tube extending throughout the length of the first mentioned tube and projecting beyond the ends of the first mentioned tube, transverse braces mounted within each wing and fixed to said bearing tube at a point beyond the ends of the supporting tube and arranged in spaced relation with respect to each other and fixed against relative movement with respect to said transverse braces, a second bracing rod extending longitudinally of each wing and fixed to said bracing plate and transverse braces for reinforcing the braces and bracing plate, said transverse braces having laterally bent flanges alternately extending in opposite directions and engaging the journal tubes and said transverse braces.

WILLIAM A. HORLACHER.